United States Patent [19]
Graham

[11] Patent Number: 4,599,772
[45] Date of Patent: Jul. 15, 1986

[54] METHOD FOR REINFORCEMENT OF PISTONS OF ALUMINUM OR ALUMINUM ALLOY

[75] Inventor: Neil A. Graham, Chard, England

[73] Assignee: AE PLC, Warwickshire, England

[21] Appl. No.: 576,556

[22] Filed: Feb. 3, 1984

[30] Foreign Application Priority Data

Feb. 4, 1983 [GB] United Kingdom ................. 8303108
Oct. 2, 1983 [GB] United Kingdom ................. 8328116

[51] Int. Cl.⁴ ....................... B23P 15/10; B22D 19/00; B22D 27/09; B22D 27/11

[52] U.S. Cl. .............................. 29/156.5 R; 29/527.5; 29/530; 29/DIG. 2; 29/DIG. 5; 29/DIG. 10; 29/DIG. 44; 92/176; 92/213; 92/224; 123/193 P; 164/98; 164/111; 164/113; 164/120

[58] Field of Search ............ 29/156.5 R, 527.1, 527.5, 29/530, DIG. 2, DIG. 5, DIG. 10, DIG. 44; 92/176, 208, 212, 213, 222, 224, 248; 123/193 P, 279; 164/98, 99, 113, 120, 111

[56] References Cited

U.S. PATENT DOCUMENTS

| | | | |
|---|---|---|---|
| 1,228,049 | 5/1917 | Rich | 92/176 |
| 1,482,778 | 2/1924 | Bowmar | 92/176 |
| 1,568,835 | 1/1926 | Hawley, Jr. | 92/208 |
| 2,057,560 | 10/1936 | Dempster | 29/156.5 R |
| 2,262,074 | 11/1941 | Welty | 29/156.5 R X |
| 3,545,341 | 12/1970 | Fischer | 92/176 |
| 3,616,729 | 11/1971 | Fishcer | 92/176 |
| 4,334,507 | 6/1982 | Köhner et al. | 29/156.5 R X |
| 4,404,262 | 9/1983 | Watmough | 29/156.5 R X |

FOREIGN PATENT DOCUMENTS

| | | | |
|---|---|---|---|
| 228280 | 8/1943 | Switzerland | 92/224 |
| 1567328 | 5/1980 | United Kingdom | 29/156.5 R |
| 2060130 | 4/1981 | United Kingdom | 29/156.5 R |

OTHER PUBLICATIONS

McGuire, "Squeeze Cast Diesel Pistons", *Diesel & Gas Turbine Progress* (Sep. 1979), pp. 59–60.
Kulkarni, "Squeeze Casting Comes of Age", *Foundry H & T* (Aug. 1974), pp. 76–79.

*Primary Examiner*—Howard N. Goldberg
*Assistant Examiner*—Ronald S. Wallace
*Attorney, Agent, or Firm*—Leydig, Voit & Mayer

[57] ABSTRACT

The reinforcement of the crown of a piston of aluminum or aluminum alloy for an internal combustion engine comprises the preparation of a reinforcement member (10, 13) which is provided with apertures (11, 14), or reentrants. The reinforcement member is placed in a crown-forming part (18) of a piston die in a squeeze casting apparatus and the piston is squeeze cast. The molten metal penetrates the apertures, or enters the reentrants, and these are so shaped that when the molten metal has solidified, keys are formed which connect securely the reinforcement member to the aluminum or aluminum alloy. Further reinforcement members can then be readily brazed or welded to the first reinforcement member.

4 Claims, 4 Drawing Figures

METHOD FOR REINFORCEMENT OF PISTONS OF ALUMINUM OR ALUMINUM ALLOY

BACKGROUND TO THE INVENTION

1. Field of the Invention

The invention relates to the reinforcement of pistons of aluminium or aluminium alloy and in particular to the reinforcement of crowns of such pistons.

Because of their comparatively light weight, aluminium and aluminium alloys are commonly used in the manufacture of pistons for internal combustion engines. They suffer, however, from the disadvantages that, as compared with many other metal materials, such as ferrous materials, they do not wear well and are not well able to withstand elevated temperatures. The most arduous conditions encountered by an internal combustion engine piston are at the crown end of the piston which, in use, bounds the combustion chamber, since it is in the combustion chamber that the highest temperatures are found.

2. Review of the Prior Art

Accordingly, there have been various proposals for reinforcing crowns of aluminium or aluminium alloy pistons to render them better able to withstand these conditions. In all such cases, however, there has been the problem of connecting the reinforcing materials securely to the aluminium or aluminium alloy because aluminium does not readily bond to many reinforcing materials and a strong bond is essential, since any failure of the connection can have far reaching consequences.

SUMMARY OF THE INVENTION

According to a first aspect of the invention, there is provided a method of reinforcing the crown of a piston of aluminium or aluminium alloy for an internal combustion engine, the method comprising inserting a crown reinforcement member into a crown-forming part of a piston die, filling the die with molten aluminium or aluminium alloy and then solidifying the molten aluminium or aluminium alloy under pressure, the reinforcement being so shaped that the solidified aluminium or aluminium alloy forms a mechanical interlock with the reinforcement whereby the reinforcement is connected to the aluminium or aluminium alloy.

According to a second aspect of the invention, there is provided wherein the groove is formed directly on the undersurface of the combustion chamber-forming portion of the reinforcement.

BRIEF DESCRIPTION OF THE DRAWINGS

The following is a more detailed description of some embodiments of the invention, by way of example, reference being made to the accompanying drawings in which.

DESCRIPTION OF THE PREFERRED EMBODIMENTS

Figure 1:
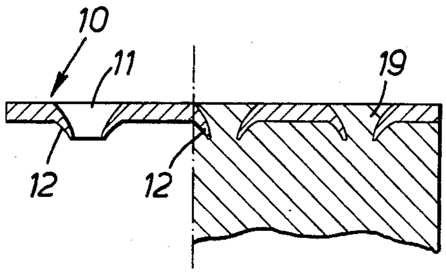
FIG. 1 shows a first form of reinforcement, the left-hand part of the Figure showing the reinforcement before connection to a piston body of aluminium or aluminium alloy and the right-hand part showing the reinforcement after such connection.

Referring first to FIG. 1, a reinforcement 10 for an aluminium or aluminium alloy piston of an internal combustion engine is formed from a disc of sheet steel having substantially the same cross-sectional area as the required cross-sectional area of the crown of the piston. The disc 10 is provided with apertures formed by holes 11 which are punched through the disc so that the material of the disc forms a depending annular converging flange 12 around each hole. In many cases, the edges of these flanges 12 will be ragged due to the punching process.

Figure 2:
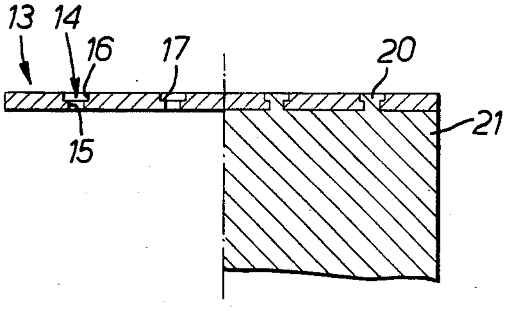
FIG. 2 shows a second form of reinforcement, the left-hand part showing the reinforcement before connection to a piston body of aluminium or aluminium alloy and the right-hand part showing the reinforcement after such connection.

Referring next to FIG. 2, the second reinforcement 13 is also formed from a disc of steel having substantially the same cross-sectional area as the required cross-sectional area of the completed piston. The disc 13 has apertures formed by passages 14 of circular cross-section with a lower part 15 of a lesser diameter and an upper part 16 of a greater diameter; the two parts being connected by a step 17.

The following description of the incorporation of a reinforcement 10, 13 into a piston is in relation to the reinforcement 10 of FIG. 1. It will be appreciated, however, that the reinforcement 13 of FIG. 2 can be similarly incorporated.

Figure 3:
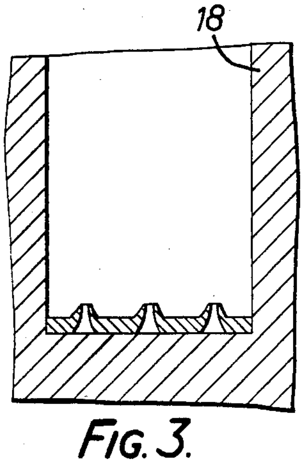
FIG. 3 is a schematic cross-section, through a lower die of a squeeze casting apparatus showing a reinforcement of the kind shown in FIG. 1, located in the die.

The reinforcement 10 is placed in the crown-defining part of a lower die member 18 of a crown-down piston squeeze casting apparatus. The reinforcement 10 is arranged in the die 18 so that the flanges 12 project upwardly, as seen in FIG. 3.

The lower die member 18 is then filled with molten aluminium or aluminium alloy and an upper die member (not shown) is lowered to close the die and then apply a load of several tons to the molten metal while it is solidifying. This causes the molten metal to be forced into the holes 11 to reach the end of the die. After solidification has been completed, the cast piston is removed from the die 18.

As best seen in FIGS. 1 and 2, the solidified aluminium or aluminium alloy forms a key 19 in each hole 11 and, because of the outwardly flared shape of the holes, the reinforcement is firmly connected to the aluminium or aluminium alloy. The ragged edges of the flanges 12 assist in strengthening the connection.

If the reinforcement of FIG. 2 is used, it will be seen that the aluminium or aluminium alloy forms a T-shaped key 20 in each hole 14, once again connecting the reinforcement 13 securely to the aluminium or aluminium piston body 21.

Such a reinforcement 10, 13 will itself provide a heat-resistant surface to the piston, thus enabling the piston to better withstand the temperatures encountered in use. However, it is also possible to use the reinforcement to provide a base of a suitable material for the attachment of a further crown part to the reinforcement in order to improve the performance of the piston in this regard.

Figure 4:
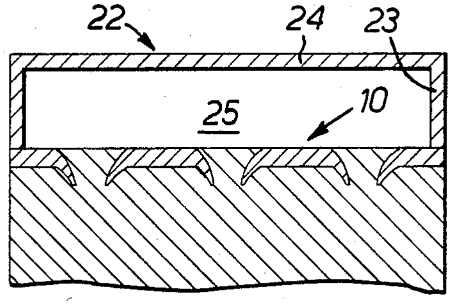
FIG. 4 is a cross-section of part of a piston incorporating the reinforcement shown in FIG. 1 and also having connected thereto a further crown part.

Referring next to FIG. 4, it can be seen that a cap 22 may be welded or brazed on to the reinforcement; the cap having an annular flange 23 and a circular top 24 which forms the crown surface of the piston. In this way, a closed chamber 25 is formed above the reinforcement 10 which insulates the surface of the crown from the aluminium or aluminium alloy body, thus further protecting the body against the temperatures of the combustion chamber.

It will be appreciated that the chamber may be filled with a heat-insulating material such as the porous metal material sold under the trade mark 'RETIMET'. It will also be appreciated that the chamber may be evacuated to reduce further heat-conduction therethrough.

In addition, the flange 23 of the cap 22 may be formed with grooves for receiving one or more piston rings.

The reinforcement need not be shaped as a disc, as shown in FIGS. 1 and 2; it may have any convenient shape, for example it may include a combustion bowl formed integrally therewith. The holes do not have as shown in FIGS. 1 and 2, they can be of any suitable shape, provided they allow the aluminium or aluminium alloy of the body to form a mechanical interlock to provide the secure connection. For example, the flanges 12 of the FIG. 1 embodiment could diverge away from the undersurface of the reinforcement, with the interlock being formed between the flange and the adjacent reinforcement surface.

The reinforcement need not be made of steel; it can be made of any material better able than the aluminium or aluminium alloy to withstand the conditions encountered in the combustion chambers of internal combustion engines.

I claim:

1. A method of reinforcing a crown of an aluminium or aluminium alloy piston for an internal combustion engine, the method comprising:

forming a crown reinforcement member in the shape of a flat disc of ferrous material, punching holes in said reinforcement member so that the material of the reinforcement forms a downwardly converging annular flange around each hole, inserting said punched disc member into a crown-forming part of a piston die, with said flanges projecting upwardly, filling the die with molten aluminium or aluminium alloy, and then solidifying the molten aluminium or aluminium alloy under pressure, whereby the aluminium or aluminium alloy is forced into said holes and, on solidification, forms an interlock with the reinforcement member to connect the reinforcement to the aluminium or aluminium alloy.

2. A method according to claim 1 and further comprising, after the connection of the reinforcement to the aluminium or aluminium alloy, the step of connecting a further crown part to the reinforcement.

3. A method according to claim 2, wherein the further crown part forms a crown end surface and an insulating chamber between the reinforcement and said crown end surface.

4. A method according to claim 3, wherein the insulating chamber is filled with heat-insulating material or is evacuated.

* * * * *